Sept. 15, 1925.

F. HESS

ELECTRIC COOKING APPARATUS FOR THE COOKING OF MEAT ESPECIALLY HAMS

Filed May 22, 1924

Inventor:

Patented Sept. 15, 1925.

1,553,776

UNITED STATES PATENT OFFICE.

FREDERIGO HESS, OF MELIDE, SWITZERLAND.

ELECTRIC COOKING APPARATUS FOR THE COOKING OF MEAT ESPECIALLY HAMS.

Application filed May 22, 1924. Serial No. 715,226.

*To all whom it may concern:*

Be it known that I, FREDERIGO HESS, a citizen of the Swiss Confederation, residing at Melide, Switzerland, have invented certain new and useful Improvements in Electric Cooking Apparatus for the Cooking of Meat Especially Hams, of which the following is a specification.

It is a well known fact that meat cooked in its own fat or juice is more tender and is of better taste than meat cooked in water; this is especially the case with hams. For cooking hams the hams are actually submitted in a closed receptacle in the water bath to a moderate and uniform temperature.

This invention relates to an electric cooking apparatus for the cooking of meat, especially hams in which the meat may be maintained at cooking temperature as uniformly as possible for a long time. The invention consists in the provision of a thermally insulated water receptacle in the apparatus, heating elements surrounded by water being arranged on the bottom of said water receptacle and protected by a perforated partition, all elements being adapted to be inserted into the apparatus from the side so that all contact heads are accommodated in a special chamber.

An embodiment of the invention is shown by way of example on the accompanying drawing, in which.

Figure 1:
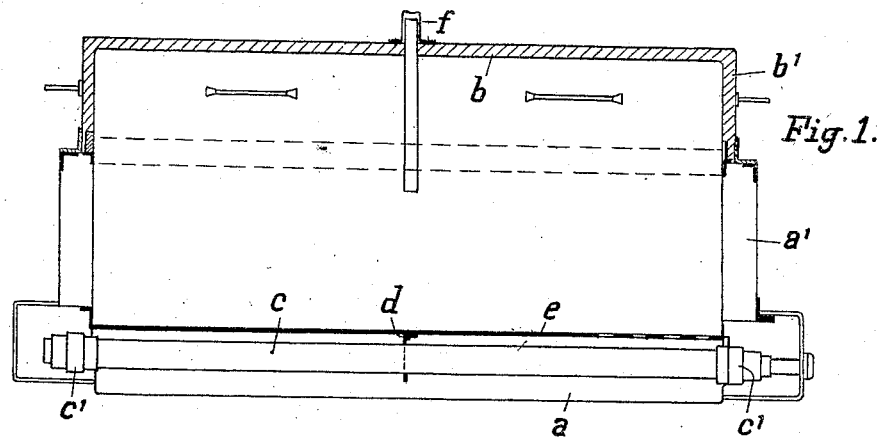
Fig. 1 shows the improved electric cooking apparatus in front elevation partly in section.
Figure 2:
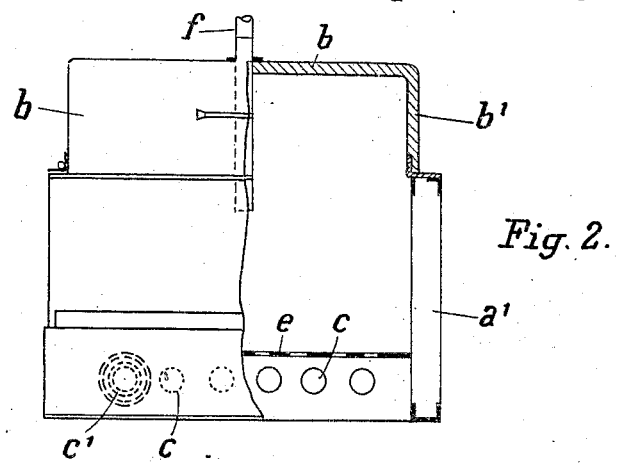
Fig. 2 is an end elevation of Fig. 1, certain parts being omitted.
Figure 3:
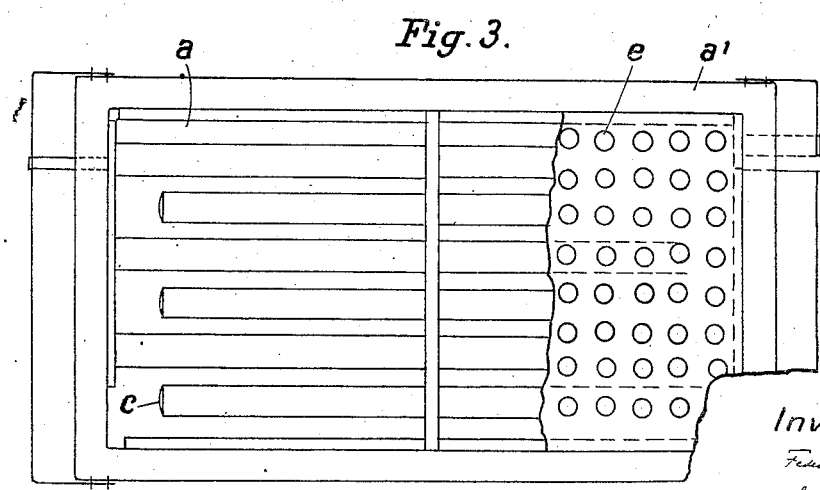
Fig. 3 is a plan view, partly in section.

The cooking apparatus consists of a water receptacle $a$ closed by a lid $b$. The receptacle $a$ and the lid $b$ are each covered with an insulating coating $a'$, $b'$ respectively so that the inner surface of the vessel is as much as possible rendered independent of the outer temperature. Into the bottom part of the receptacle $a$ heating elements $c$ are inserted alternately the one from the one end and the other from the other end so that the terminals are alternately located at the one end and at the other end of the apparatus. A vertical partition $d$ having holes one for each heating element serves as support for these heating elements. The terminals $c'$ are arranged in such a manner that each heating element can be exchanged independently of the other. The contact heads $c'$ are alternately located in special chambers, one at either side of the apparatus and formed by outer sheet metal walls on the one hand and by the side walls of the water receptacle on the other hand. The heating elements are arranged under a perforated horizontal partition $e$ which serves not only to protect the heating elements but also to distribute the heat uniformly over the water receptacle.

The air-tightly closed boxes containing the hams to be cooked are placed upon the perforated horizontal partition $e$, whereupon the receptacle $a$ is partly filled with water. The lid is closed and the current is switched on. The heat produced by the heating elements is distributed through the perforated horizontal partition $e$ so that the water is uniformly heated. As soon as the water has been heated to the desired temperature of about 90° C. the current is switched off and the apparatus continues to work as automatic cooker, the hams being cooked in their own juice after approximately four hours, a thermometer $f$ serves to control the temperature in the apparatus.

I claim:—

1. An electric cooking apparatus for the cooking of meat, especially hams comprising in combination a thermally insulated water receptacle, electric heating elements in the bottom part of said water receptacle, a perforated horizontal partition above said heating elements, contact heads one for each heating element, and separate chambers at either side of said water receptacle designed to accommodate said contact heads.

2. An electric cooking apparatus for the cooking of meat, especially hams comprising in combination a thermally insulated water receptacle, a lid for said receptacle, an insulating layer on said heating receptacle and on said lid, an inner drip edge of said lid for preventing the formation of water from condensation, electric heating elements in the bottom part of said water receptacle, a perforated horizontal partition above said heating elements, contact heads one for each heating element, and separate chambers at either side of said water receptacle designed to accommodate said contact heads.

In testimony whereof I affix my signature.

FREDERIGO HESS.